United States Patent Office 3,400,163
Patented Sept. 3, 1968

3,400,163
BICYCLIC HETEROCYCLIC SEC- AND
TERT-PHOSPHINES
Ronald F. Mason, Mill Valley, and John L. Van Winkle,
San Lorenzo, Calif., assignors to Shell Oil Company,
New York, N.Y., a corporation of Delaware
No Drawing. Filed June 30, 1965, Ser. No. 468,572
20 Claims. (Cl. 260—606.5)

ABSTRACT OF THE DISCLOSURE

Hydrocarbyl-substituted or unsubstituted monophosphabicylcloalkanes of 8 to 9 atoms in which the smallest phosphorus-containing ring contains at least 5 atoms and the phosphorus atom therein is a member of a bridge linkage but is not a bridgehead atom, and the process of producing them by reacting in substantially equimolecular amounts cyclic hydrocarbon of 7 to 8 ring carbon atoms containing two non-conjugated and non-homoconjugative double bonds with a phosphine of the formula $QPH_2$ in which Q represents hydrogen or a hydrocarbyl group in the presence of a free radical-generating catalyst and in the absence of substantial amounts of oxygen. The said monophosphabicycloalkanes are useful as phosphine ligands for organometallic complex catalysts.

This invention relates to certain heterocyclic phosphines and to a method for the production thereof. More particularly, it relates to a novel class of bicylic heterocyclic sec- and tert-phosphines and to methods by which such polycyclic compounds are produced.

Certain diphosphabicyclooctanes and analogs thereof have been reported. R. C. Hinton and F. G. Mann, J. Chem. Soc., 1959, 2835, have disclosed the reduction of 1,4-dibenzyltriethylenediphosphonium bromide with $LiAlH_4$ to produce a small amount of 1,4-diphosphabicyclo[2.2.2]octane. C. G. Krespan in U.S. 2,996,527 disclosed 2,3,5,6,7,8-hexakis(polyfluoroalkyl) - 1,4 - diphosphabicyclo[2.2.2]octa-2,5,7-trienes and their preparation by heating red phosphorus with bis(polyfluoroalkyl) acetylenes and a catalytic amount of iodine.

It is an object of the present invention to provide a novel class of phophorus-containing polycyclic organic compounds and methods for the production thereof. A more particular object is to provide novel monophosphabicyloalkanes in which ring system (a) the bicycloalkanes are bicyclooctanes or bicyclononanes, (b) the phosphorus atom is a member of a bridge linkage, and (c) the phosphorus atom is not in a bridgehead position. An additional object is to provide novel methods for the production of such bicyclic compounds.

It has now been found that these objects are accomplished by processes which comprise the reaction of certain phosphines with suitable cyclic diolefinic compounds. Such processes provide the desired ring system directly either in a one- or, alternatively, a two-step procedure.

The novel compounds of the invention comprise bicyclic heterocyclic sec- and tert-phosphines. Generically, these compounds are hydrocarbyl-substituted or unsubstituted monophosphabicycloalkanes of 8 to 9 atoms in which the smallest phosphorus-containing ring contains at least 5 atoms, and the phosphorus atom therein is a member of a bridge linkage but is not a bridgehead atom. In addition to the hydrocarbyl substitution on the phosphorus atom, the ring carbons may also be substituted. However, it is preferred that such C-substituents be limited to non-bulky ones. One class of such compounds has from 7 to 46 carbon atoms, preferably from 12 to 40, and is represented by the formula

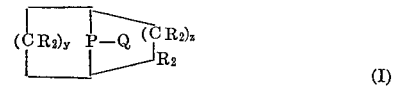

(I)

where Q represents hydrogen or hydrocarbyl, y and z represent positive integers whose sum is from 2 to 3 and each of which has a minimum value of 1, and R represents hydrogen and lower alkyl of from 1 to 4 carbon atoms, such as methyl, ethyl, propyl, and butyl. It is preferred that no more than two R groups be alkyl at any one time and that each of these be attached to a different ring carbon. It is to be understood that in the foregoing graphic formula and those appearing hereinafter the line portion of the structure represents a conventional organic chemical covalent bond with saturated carbon atom at each indicated intersection, the saturation being by the required number of hydrogen atoms or hydrocarbyl radicals.

The term "hydrocarbyl" is used in its accepted meaning as representing a radical formed from a hydrocarbon by removal of a hydrogen atom. The hydrocarbyl groups represented by Q in the formula above may be any non-acetylenic organic radical composed solely of carbon and hydrogen. The widest variation is possible in that the (non-acetylenic) hydrocarbyl group may be alkyl, alkenyl, cycloalkyl, cycloalkenyl, aryl, aralkyl, alkaryl, single ring, multi-ring, straight chain, branched chain, large, or small. Representative hydrocarbyl groups include methyl, ethyl, methallyl, n-butyl, hexenyl, isooctyl, dodecyl, oleyl, octadecyl, eicosyl, hexacosyl, octacosyl, triacontyl, hexatriacontyl, tetracontyl, cyclohexyl, cyclooctyl, cyclooctenyl, phenyl, naphthyl, benzyl, styryl, phenethyl, and the like. Thus, a particularly useful class of bicyclic heterocyclic tert-phosphines is that containing only carbon, hydrogen, and phosphorus atoms.

Substituted hydrocarbyl groups are also contemplated and may contain a functional group such as the carbonyl, carboxyl, nitro, amino, hydroxy (e.g. hydroxyethyl), cyano, sulfonyl, and sulfoxyl groups. A particularly useful group of phosphines consists of those in which Q is hydrocarbyl of from 1 to 36 carbon atoms; especially preferred are those in which Q is hydrocarbyl of from 4 to 30 carbons.

Hence, a preferred group of bicyclic heterocyclic tert-phosphines includes those represented by the formula

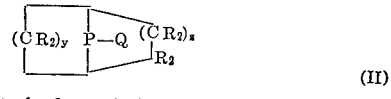

(II)

where Q represents hydrocarbyl of 1 to 36 carbons and especially of 4 to 30, y and z represent positive integers whose sum is from 2 to 3 and each of which has a minimum value of 1, and R is a member selected from the group consisting of hydrogen and alkyl of 1 to 4 carbons such that no more than two R groups be alkyl at any one time and that each of said alkyl groups be attached to a different ring carbon.

It is sometimes desirable to balance the size of the substituents in the aforedescribed phosphines. When the R substituents are relatively large, e.g., butyl, it may be desirable to choose a smaller Q. Conversely, when Q is large, e.g., eicosyl or hexatriacontyl, it may be desirable that the R substituents be smaller and/or less numerous, such as monomethyl or dimethyl. Particularly useful compounds are those in which the sum of R and Q is no greater than 38 carbon atoms and those in which the total number of carbon atoms is no greater than 46.

Similarly, a preferred group of bicyclic heterocyclic sec-phosphines includes those represented by the foregoing Formula II, but in which Q represents hydrogen.

The bicyclic compounds of the invention are produced by reacting certain phosphines with suitable cyclic diolefinic compounds in the presence of a free radical-generating catalyst and in the absence of substantial amounts of oxygen. In a preferred one-step method, the aforesaid bicyclic compounds are produced by reacting a cyclic hydrocarbon containing two ring non-conjugated and non-homoconjugative double bonds with phosphine (pH$_3$) or monosubstituted, i.e., primary, phosphine in the presence of a free radical-generating catalyst and in the absence of substantial amounts of oxygen.

The cyclic hydrocarbons which are useful in the practice of this process are cyclic dienes in which the double bonds not only are isolated, i.e., non-conjugated double bonds, but also are non-homoconjugative double bonds, i.e., non-conjugated systems which do not behave as conjugated systems. A particular useful class of cyclic hydrocarbons is that represented by the formula

(III)

where $y$ and $z$ represent positive integers whose sum is from 2 to 3 and each of which has a minimum value of 1, and R represents hydrogen and lower alkyl of from 1 to 4 carbon atoms such that no more than two R groups be alkyl at any one time and that each of said alkyl groups be attached to a different ring carbon. Representative examples of these cyclic dienes include, 1,5-cyclooctadiene, 3,7-dimethyl-1,5-cyclooctadiene, 3,8-dimethyl-1,5-cyclooctadiene, 1,4-cycloheptadiene, 6-methyl-1,4-cycloheptadiene, and the like. Preferred are 1,5-cyclooctadiene and 3,7-dimethyl-1,5-cyclooctadiene. Larger ring compound starting reactants are not preferred because the cyclization reaction operates most favorably when the bicyclic rings formed are 5-, 6-, and 7-member rings. It is to be understood that cyclic conjugated dienes and cyclic non-conjugated homoconjugative dienes are inoperable. Examples of such conjugated dienes include 1,3-cyclohexadiene, 1,3-cycloheptadiene, 1,3-cyclooctadiene, and the like. Cyclic non-conjugated homoconjugative dienes include 1,4-cyclohexadiene, bicyclo[2.21]hepta-2,5-diene (a bridged 1,4-cyclohexadiene), and the like. Such reagents do not yield the novel cyclization of the present invention but react with one hydrogen atom of the primary phosphine reactant in a conventional 1,4-addition known to the prior art to yield a resulting secondary, i.e., disubstituted, phosphine.

The phosphine to be used in the practice of this invention has the formula QPH$_2$ in which Q represents hydrogen or a hydrocarbyl group. When Q is hydrogen, the phosphine reagent is phosphine (PH$_3$) itself. When Q is hydrocarbyl, the phosphine reagent is a monosubstituted phosphine, i.e., primary organic phosphine. The term "hydrocarbyl" is used in its accepted meaning as representing a radical formed from a hydrocarbon by removal of a hydrogen atom. The hydrocarbyl groups represented by Q may be any non-acetylenic organic radical composed solely of carbon and hydrogen. The widest variation is possible in that the (non-acetylenic) hydrocarbyl group may be alykyl, alkenyl, cycloalkyl, cycloalkenyl, aryl, aralkyl, alkaryl, single ring, multi-ring, straight chain, branched chain, large or small. Representative hydrocarbyl groups include methyl, ethyl, methallyl, n-butyl, hexyl, isooctyl, dodecyl, oleyl, octadeyl, eicosyl, hexacosyl, octacosyl, triacontyl, hexatriacontyl, tetracontyl, cyclohexyl, cyclooctyl, cyclooctenyl, phenyl, naphthyl, benzyl, phenethyl, and the like. A preferred group of primary phosphines consists of those in which Q is hydrocarbyl of from 1 to 36 carbons, and especially preferred are those in which Q is from 4 to 30 carbons.

The cyclization reaction is carried out with the aid of a free radical-generating catalyst, such as an azonitrile, or a dialkyl or diacyl peroxide. The term "free radical-generating catalyst" is also meant to include actinic radiation, particularly ultraviolet light, and high energy or ionizing radiation such as use of cobalt-60, a source of high-energy $\gamma$ or X-rays. The azonitrile catalysts which may be employed in this reaction are well known in the art and include $\alpha,\alpha'$-azobisisobutyronitrile; $\alpha,\alpha'$-azobis-($\alpha$-methylbutyronitrile); $\alpha,\alpha'$-azobis($\alpha$-methylisocapronitrile); and the like. Suitable peroxide catalysts include the dialkyl peroxides such as di(tert-butyl)peroxides, and the diacyl peroxides such as butylryl, lauroyl, and benzoyl peroxides. The amount of catalyst which may be used may vary over a wide range from 0.1% by weight upward. From 0.5 to 5% by weight of catalyst, based on the weight of the phosphine reactant, is ordinarily desirable. The dialkyl peroxides represent a preferred class of catalysts owing to their unusual stability during handling.

The two reactants may be used in equimolecular amounts or in a slight molar excess of one reactant or the other. In a preferred mode of operation the reactants are used in equimolar quantities to maximize the cyclization. The reaction may be conducted in the presence of a non-reactive solvent medium such as aliphatic cyclic and acyclic saturated hydrocarbons, e.g., pentane, n-hexane, cyclohexane, petroleum ether, isooctane, and the like. It is sometimes desirable, for example, when the molecular weights of the reactants are low, to conduct the cyclization in the presence of one of the aforesaid solvents in order to dilute the reactants, thereby maximizing cyclization and minimizing polymerization. Such solvents also aid in dissipating the heat generated in this exothermic reaction. The mixture and its environment should be free of substances, such as oxygen and air, capable of converting the desired bicyclic heterocyclic phosphines to the corresponding compounds of a higher oxidative state, e.g., phosphine oxides in the case of tert-phosphines. Hence, the reaction should be conducted in an inert atmosphere such as under nitrogen or, when the reactants are sufficiently high boiling, under vacuum. If desired, small amounts of oxidative inhibitors optionally may be added.

The temperature at which the reaction should be conducted will be governed by the specific catalyst employed in that a useful temperature is one at which the free radical-generating catalyst decomposes or furnishes free radicals at a moderately even rate throughout the course of the reaction. For example, when the free radical-generating catalyst is actinic radiation, particularly ultraviolet light, ambient room temperature is sufficient. When $\alpha,\alpha'$-azobisisobutyronitrile is the catalyst, a temperature of about 70° C., conveniently obtained by conducting the reaction in refluxing n-hexane, is sufficient. On the other hand, when the free radical-generating catalyst is a dialkyl peroxide, temperatures of 110°–150° C. will be desired in order to decompose smoothly the peroxide. The cyclization may be carried out at any temperature short of the rapid decomposition point of any of the catalysts used. The lower temperature limit is that at which the condensation becomes impractically slow. Temperatures from −10° to 200° C. may be used, the preferred range ordinarily being from room temperature (15° C.) to about 175° C. The reaction will usually be carried out at just above atmospheric pressure, although higher or lower pressures may be used, with due consideration given to the physical properties of the reactants, e.g., volatility and the like, as mentioned previously.

An alternative method by which the novel bicyclic heterocyclic tert-phosphines can be produced is a two-step process. In the first step, the hereinabove-described cyclic dienes in the presence of a free radical-generating catalyst and in the absence of substantial amounts of oxygen undergo the cyclization process with phosphine (PH$_3$) to produce the aforesaid novel bicyclic heterocyclic sec-phosphine. Optionally without further isolation, the sec-phosphine is reacted in the presence of a free radical-generating catalyst with a compound containing at least one ethylenically unsaturated linkage, e.g., an olefin or a diolefin, such as ACH=CH₂ where A is hydrocarbyl or

where A is hydrocarbylene, to produce the tert-phosphine. For example, phosphine (PH₃) and 1,5-cyclooctadiene can be cyclized to give the corresponding bicyclic sec-phosphine; then cyclooctene or cyclododecene or even additional cyclooctadiene may be added as the ethylenically unsaturated reagent to yield in the second step a cyclic - substituted bicyclic tert - phosphine. Phosphine (PH₃) made by various methods, for example that made by chemical or electrochemical methods, and in different degrees of purity may be utilized in this alternative method. Such a reaction sequence as described hereinabove lends itself well to commercial processing and is economically feasible and attractive. An additional advantage is the elimination of difficult preparation of monosubstituted (primary) phosphine, i.e. the QPH₂, where Q is hydrocarbyl, particularly in the case of long-chain alkylphosphines such as eicosylphosphine and the like.

It will be apparent from the preceding discussion that a variety of substituted and unsubstituted monophosphabicycloalkanes may be produced. In the nomenclature of such compounds, as well as the reactants employed for the production thereof, conventional numbering of the ring systems has been employed, as further illustrated by the following formulas:

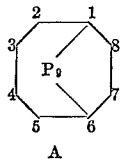 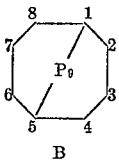 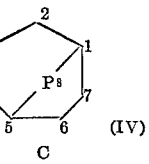

A         B         C      (IV)

Typical products of the process of the invention, numbered according to this system include 9-phosphabicyclononane in which the smallest P-containing ring contains at least 5 atoms;
9-phosphabicyclo[4.2.1]nonane;
9-phosphabicyclo[3.3.1]nonane;
9-hydrocarbyl-9-phosphabicyclononane in which the smallest P-containing ring contains at least 5 atoms;
9-hydrocarbyl-9-phosphabicyclo[4.2.1]nonane;
9-aryl-9-phosphabicyclo[4.2.1]nonane, such as
  9-phenyl-9-phosphabicyclo[4.2.1]nonane;
(di)alkyl-9-aryl-9-phosphabicyclo[4.2.1]nonane, such as
  3,7-dimethyl-9-phenyl-9-phosphabicyclo[4.2.1]nonane and 3,8-dimethyl-9-phenyl-9-phosphabicyclo-[4.2.1]nonane;
9-alkyl-9-phosphabicyclo[4.2.1]nonane, such as
  9-octadecyl-9-phosphabicyclo[4.2.1]nonane,
  9-hexyl-9-phosphabicyclo[4.2.1]nonane,
  9-eicosyl-9-phosphabicyclo[4.2.1]nonane, and
  9-triacontyl-9-phosphabicyclo[4.2.1]nonane;
9-cycloalkyl-9-phosphabicyclo[4.2.1]nonane, such as
  9-cyclohexyl-9-phosphabicyclo[4.2.1]nonane;
9-hydrocarbyl-9-phosphabicyclo[3.3.1]nonane;
9-aryl-9-phosphabicyclo[3.3.1]nonane;
9-aryl-9-phosphabicyclo[3.3.1]nonane, such as
  9-phenyl-9-phosphabicyclo[3.3.1]nonane;
9-alkyl-9-phosphabicyclo[3.3.1]nonane, such as
  9-hexyl-9-phosphabicyclo[3.3.1]nonane and
  9-eicosyl-9-phosphabicyclo[3.3.1]nonane;
(di)alkyl-9-aryl-9-phosphabicyclo[3.3.1]nonane, such as
  3,7-dimethyl-9-phenyl-9-phosphabicyclo[3.3.1]nonane and 3,8-dimethyl-9-phenyl-9-phosphabicyclo-[3.3.1]nonane;
9-cycloalkyl-9-phosphabicyclo[3.3.1]nonane, such as
  9-cyclohexyl-9-phosphabicyclo[3.3.1]nonane;
8-phosphabicyclo[3.2.1]octane;
8-hydrocarbyl-8-phosphabicyclo[3.2.1]octane;
8-aryl-8-phosphabicyclo[3.2.1]octane, such as
  8-phenyl-8-phosphabicyclo[3.2.1]octane;
alkyl-8-aryl-8-phosphabicyclo[3.2.1]octane, such as
  6-methyl-8-phenyl-8-phosphabicyclo[3.2.1]octane;
8-alkyl-8-phosphabicyclo[3.2.1]octane, such as
  8-butyl-8-phosphabicyclo[3.2.1]octane,
  8-eicosyl-8-phosphabicyclo[3.2.1]octane,
  8-triacontyl-8-phosphabicyclo[3.2.1]octane, and
  8-octadecyl-8-phosphabicyclo[3.2.1]octane;
and the like.

The novel bicyclic heterocyclic tert-phosphines of this invention are useful as phosphine ligands for organometallic complex catalysts. For example, in the hydroformylation of olefins to aldheydes and/or alcohols the cobalt-carbonyl-heterocyclic phosphine complexes are excellent catalysts as is demonstrated in copending U.S. application of J. L. Van Winkle et al., Ser. No. 468,573, filed on the same day. An added advantage is the higher resistance to oxidation during the hydroformylation process of the heterocyclic phosphines particularly when compared with that of acyclic phosphines, such as trialkylphosphine. The heterocyclic tert-phosphines of the invention are also useful as catalysts in the dimerization of acrylonitrile to 2-methyleneglutaronitrile.

To further illustrate the novel process of the invention and the novel products obtained thereby, the following examples are provided. It should be understood that they are not to be regarded as limitations, as the teachings thereof may be varied as will be understood by one skilled in the art.

EXAMPLE I

A 500-ml.reactor flask fitted with stirrer, thermometer, reflux condenser, dropping funnel and nitrogen inlet was charged with 81 grams (0.75 mole) of redistilled 1,5-cyclooctadiene and 83 grams (0.75 mole) of phenylphosphine. A nitrogen blanket was maintained at all times. A sample was then removed and its infrared spectrum recorded. The temperature of the reaction mixture was raised to 135° C. by means of an oil bath, and a solution of 2.8 grams (0.019 mole) of di(tert-butyl)peroxide in 10 ml. of n-decane added at such a rate as to maintain the temperature at 135–145° C. The exothermic reaction was controlled by lowering the oil batch as necessary; the addition required 50 minutes. The mixture was then held at 150° C. for one hour. Another portion of di(tert-butyl)peroxide, equal to that above, was then added rapidly and the mixture held at 150° C. for one additional hour. The infrared spectrum indicated that olefinic bands at 6.1 and 4.4µ had disappeared. The reaction mixture was then distilled through a 6-inch Vigreux column to give 138 grams (84%) of a mixture of 9-phenyl-9-phosphabicyclo[4.2.1]nonane and 9 - phenyl-9-phosphabicyclo[3.3.1]nonane, B.P. 134–135° C. at 0.3 mm. Still residue amounted to 15.3 grams.

*Analysis.*—Calculated for C₁₄H₁₉P: Basicity, 0.46 eq./100 g. Found: Basicity, 0.43 eq./100 g.

Gas chromatographic analysis (6-ft. silicone rubber column, 225° C.) demonstrated the presence of two closely eluted isomers in the ratio of 1.99:1. On standing for several days at ambient temperature this material partially crystallized. The crystals were separated from the mother liquor by filtration in an atmosphere of nitrogen. Two sublimations (at 0.5 mm.) from an oil bath at 70° C. afforded analytically pure 9-phenyl-9-phosphabicyclo[3.3.1] nonane, M.P. 85.5–86.5° C., the isomer eluting later in the gas chromatographic analysis.

*Analysis.*—Calculated for C₁₄H₁₉P: C, 77.0; H, 8.8; P, 14.2. Found: C, 76.9; H, 8.9; P, 14.5.

Gas chromatographic analysis of the mother liquor showed that the ratio of earlier, i.e., 9-phenyl-9-phosphabicyclo[4.2.1]nonane, to later eluting isomer had increased to 3.66:1. The structural assignment of the isomers is based on mass spectral data.

EXAMPLE II

A Pyrex glass polymerization bottle was flushed with nitrogen and charged with 22 grams (0.2 mole) of phenylphosphine, 22 grams (0.2 mole) of redistilled 1,5-cyclooctadiene, and 150 ml. of deaerated hexane. It was placed approximately 2 inches from a mercury vapor lamp (GE H100–A4 with glass envelope removed) housed in a water-cooled quartz thimble. After irradiation for eight days, the solvent was removed and the product distilled through a 6-inch Vigreux column to give 31.4 grams of a mixture of 9 - phenyl-9-phosphabicyclononanes, B.P. 123–127° C. Still residue weighed 2.4 grams, corresponding to 71% conversion of reactants to the desired product with 94% yield based on residue loss.

*Analysis.*—Calculated for $C_{14}H_{19}P$: C, 77.0; H, 8.8; P, 14.2; basicity, 0.46 eq./100 g. Found: C, 76.8; H, 8.8; P, 14.2; basicity, 0.47 eq./100 g.

Gas chromatographic analysis showed that the ratio of 9-phenyl-9-phosphabicyclo[4.2.1]nonane to 9 - phenyl-9-phosphabicyclo[3.3.1]nonane was 1.91:1. The product was further characterized by preparation of its ethiodide, which formed fern-like crystals melting at 277–278° C. (dec.) after two recrystallizations from ethanol.

*Analysis.*—Calculated for $C_{16}H_{24}PI$: C, 51.4; H, 6.5; P, 8.3; I, 33.9. Found: C, 51.5; H, 6.5; P, 8.5; I, 34.0.

EXAMPLE III

A mixture of 22 grams (0.2 mole) of redistilled 1,5-cyclooctadiene, 22 grams (0.2 mole) of phenylphosphine, and 150 ml. of degassed hexane were placed in a Pyrex polymerization bottle. The mixture was then exposed to $\gamma$-radiation from a $Co^{60}$ source at ambient temperature for 64 hours with a dose rate of 0.1 mrad/hr. Distillation through a 6-inch Vigreux column gave 27.8 grams of a mixture of 9-phenyl-9-phosphabicyclononanes, B.P. 126–132° C. at 0.3–0.4 mm. Still residue weighed 2.0 grams corresponding to 68% conversion of reactants with 95% yield.

EXAMPLE IV

A 500-ml. Morton flask fitted with stirrer, thermometer condenser and dropping funnel was purged with nitrogen and charged with 157 grams (0.5 mole) of eicosylphosphine and 54 grams (0.5 mole) of redistilled 1,5-cyclooctadiene. A nitrogen blanket was maintained and the reactants brought to 135° C. by immersion in an oil bath. A sample was removed and its infrared spectrum recorded. Then a solution of 4 grams (0.025 mole) of di(tert-butyl)peroxide in 15 ml. of n-decane was added dropwise over a period of one hour. The reaction was exothermic and the temperature was maintained at 135–145° C. by temporarily lowering the oil bath. After addition of the catalyst, the mixture was heated for one hour at 150° C. The olefinic band at 6.05μ had then disappeared. Heating for one additional hour had no effect on residual P–H absorbance. Claisen distillation of the reaction mixture using steam in the condenser jacket gave 20 grams of unreacted eicosylphosphine, B.P. 164–210° C. at 0.8 mm., and 155 grams of a mixture of 9-eicosyl-9-phosphabicyclo[4.2.1]nonane and 9-eicosyl-9-phosphabicyclo[3.3.1]nonane, B.P. 230–238° C. at 0.3 mm. (M.P. 38–39° C.). The pot residue weighed 22 grams, representing 87% conversion of reactants to desired product in 84% yield.

*Analysis.*—Calculated for $C_{28}H_{55}P$: C, 79.6; H, 13.1; P, 7.3; basicity, 0.25 eq./100 g. Found: C, 79.8; H, 13.2; P, 7.3; basicity, 0.23 eq./100 g.

EXAMPLE V

A mixture of 162 grams (1.5 moles) of redistilled 1,5-cyclooctadiene, 100 ml. of deaerated pentane, and 12.3 grams (0.075 mole) of azobisisobutyronitrile was charged to a 700 ml. pressure vessel. The vessel was closed, cooled to −80° C. in a Dry Ice bath and evacuated. Nitrogen was bled in and the process repeated twice more in order to remove oxygen. 52 grams (1.5 moles) of phosphine was then charged to the evacuated vessel by means of a weighed transfer bomb. The vessel was then gently heated to 75° C., at which temperature the pressure was 275 p.s.i.g. After 20 minutes at 75° C., exothermic increase to 85° C. occurred accompanied by a pressure drop. One hour after the initial reaction had commenced, the pressure remained steady at 115 p.s.i.g. Heating at 75° C. was continued for a total of 12 hours. The vessel was again quenched in Dry Ice, evacuated, and nitrogen bled in. The contents were then transferred under a blanket of nitrogen to a distillation flask, the vessel being rinsed with degassed pentane. The solvent was removed by distillation under nitrogen, the kettle temperature being taken to 90° C. The crude product weighed 211 grams. Sublimation from an oil bath at 100° C. and 0.3 mm. gave 120 grams (57%) of a mixture of 9-phosphabicyclo[4.2.1]nonane and 9-phosphabicyclo[3.3.1]nonane, M.P. 117° C.

*Analysis.*—Calculated for $C_8H_{15}P$: C, 67.6; H, 10.6; P, 21.8. Found: C, 66.9; H, 10.8; P, 21.2.

Gas chromatographic analysis of this product demonstrated the presence of two closely eluted isomers, 9-phosphabicyclo[4.2.1]nonane and 9 - phosphabicyclo[3.3.1]nonane, in the ratio of 0.55:1.

EXAMPLE VI

A mixture of 27.4 grams (0.19 mole) of 9-phosphabicyclononanes (prepared in Example V), 84 grams (1.0 mole) of 1-hexene, and 1.65 grams (0.01 mole) of azobisisobutyronitrile was heated under reflux in an atmosphere of nitrogen. After 29 hours, the P–H band in the infrared spectrum at 2280 cm.$^{-1}$ had almost completely disappeared. The excess 1-hexene was stripped off and distillation through a 6-inch Vigreux column gave 30 grams (69%) of a moisture of 9-hexyl-9-phosphabicyclo[4.2.1]nonane and 9-hexyl-9-phosphabicyclo[3.3.1]nonane, B.P. 122–125° C. at 0.5 mm. Pot residue weighed 5.9 grams.

*Analysis.*—Calculated for $C_{14}H_{27}P$: C, 74.3; H, 12.0; basicity, 0.44 eq./100 g. Found: C, 74.5; H, 12.0; basicity, 0.43 eq./100 g.

The product was further characterized by preparation of its methiodide which crystallized from ethanol-ethyl acetate in plates and melted at 248–249° C. (dec.).

We claim as our invention:

1. Monophosphabicycloalkanes in which the phosphorus atom is substituted with hydrogen or non-acetylenic hydrocarbyl of 1 to 36 carbon atoms and is a member of a bridge linkage without being a bridgehead atom and which monophosphabicycloalkane has 7 to 46 carbon atoms, 7 to 8 carbon atoms thereof together with the phosphorus atom being members of the bicyclic skeletal structure.

2. Phosphabicycloalkanes of the formula

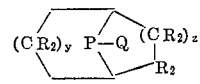

where Q represents hydrogen or non-acetylenic hydrocarbyl of 1 to 36 carbon atoms, y and z represent positive integers whose sum is from 2 to 3, and R represents hydrogen or lower alkyl of 1 to 4 carbons such that no more than two R groups are alkyl at any one time and that each of said alkyl groups is attached to a different ring carbon.

3. Phosphabicycloalkanes according to claim 2 wherein Q represents alkyl of 1 to 36 carbons.

4. Phosphabicycloalkanes according to claim 2 wherein Q represents alkyl of 4 to 30 carbons.

5. Phosphabicycloalkanes according to claim 2 wherein Q represents hydrogen.

6. 9-phosphabicyclononane in which the smallest phosphorus-containing ring contains at least 5 atoms.
7. 9-phosphabicyclo[4.2.1]nonane.
8. 9-phosphabicyclo[3.3.1]nonane.
9. 9-hydrocarbyl-9-phosphabicyclononane in which the smallest phosphorus-containing ring contains at least 5 atoms and hydrocarbyl is non-acetylenic hydrocarbyl of 1 to 36 carbon atoms.
10. 9-aryl-9-phosphabicyclononane in which the smallest phosphorus-containing ring contains at least 5 atoms.
11. 9-phenyl-9-phosphabicyclo[4.2.1]nonane.
12. 9-phenyl-9-phosphabicyclo[3.3.1]nonane.
13. 9-alkyl-9-phosphabicyclononane in which the smallest phosphorus-containing ring contains at least 5 atoms.
14. 9-eicosyl-9-phosphabicyclo[4.2.1]nonane.
15. 9-eicosyl-9-phosphabicyclo[3.3.1]nonane.
16. The process of producing bicyclic heterocyclic sec- or tert-phosphines by reacting in substantially equimolecular amounts cyclic hydrocarbon of from 7 to 8 ring carbon atoms containing two non-conjugated and non-homoconjugative double bonds with a phosphine of the formula $QPH_2$ in which Q represents hydrogen or a non-acetylenic hydrocarbyl group of 1 to 36 carbon atoms in the presence of a free radical-generating catalyst and in the absence of substantial amounts of oxygen.
17. The process of producing bicyclic heterocyclic sec- or tert-phosphines by reacting in substantially equimolecular amounts a cyclic diene hydrocarbon of from 7 to 8 ring carbon atoms and having the formula

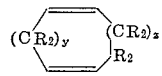

in which y and z represent positive integers whose sum is from 2 to 3 and R represents hydrogen or lower alkyl of 1 to 4 carbons such that no more than two R groups are alkyl at any one time and that each of said alkyl groups is attached to a different ring carbon with a phosphine of the formula $QPH_2$ in which Q represents hydrogen or an alkyl group in the presence of a free radical-generating catalyst and in the absence of substantial amounts of oxygen.

18. A process according to claim 17 in which the reaction is conducted in the presence of a saturated, liquid hydrocarbon.

19. A process according to claim 16 in which the cyclic hydrocarbon is 1,5-cyclooctadiene.

20. The process of producing bicyclic heterocyclic tert-phosphine by reacting in substantially equimolecular amounts cyclic diene hydrocarbon of from 7 to 8 ring carbon atoms and having the formula

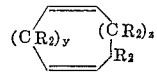

in which y and z represent positive integers whose sum is from 2 to 3 and R represents hydrogen or lower alkyl of 1 to 4 carbons such that no more than two R groups are alkyl at any one time and that each of said alkyl groups is attached to a different ring carbon with a phosphine of the formula $QPH_2$ in which Q represents hydrogen and then additionally reacting the in situ products formed thereby with a compound having at least one ethylenically unsaturated linkage in the presence of a free radical-generating catalyst and in the absence of substantial amounts of oxygen.

References Cited

UNITED STATES PATENTS

| | | | |
|---|---|---|---|
| 3,010,946 | 11/1961 | Garner | 260—78.4 |
| 3,218,358 | 11/1965 | Welcher | 260—606.5 |
| 3,225,103 | 12/1965 | Welcher | 260—606.5 |

TOBIAS E. LEVOW, *Primary Examiner.*

W. F. BELLAMY, *Assistant Examiner.*